United States Patent [19]

Inoue

[11] Patent Number: 5,731,884
[45] Date of Patent: Mar. 24, 1998

[54] METHOD OF AN APPARATUS FOR OUTPUTTING HALFTONE DOT IMAGE

[75] Inventor: Yoshiaki Inoue, Kanagawa-ken, Japan

[73] Assignee: Fuji Photo Film Co., Ltd., Kanagawa, Japan

[21] Appl. No.: 735,412

[22] Filed: Oct. 22, 1996

[30] Foreign Application Priority Data

Oct. 31, 1995 [JP] Japan ................................. 7-283503

[51] Int. Cl.$^6$ ........................................................ H04N 1/40
[52] U.S. Cl. .............................. 358/456; 358/298; 358/459
[58] Field of Search ........................... 358/448, 298, 358/456–461, 534–536, 429; 395/107; 399/180–181

[56] References Cited

U.S. PATENT DOCUMENTS

| | | | |
|---|---|---|---|
| 4,051,536 | 9/1977 | Roetling | 358/4 |
| 4,347,523 | 8/1982 | Ohara | 346/108 |
| 4,586,089 | 4/1986 | Nakazato et al. | 358/280 |
| 4,792,979 | 12/1988 | Nomura et al. | 382/54 |
| 4,845,550 | 7/1989 | Urabe et al. | 358/80 |
| 4,899,216 | 2/1990 | Tatsumi et al. | 358/80 |
| 4,987,498 | 1/1991 | Shimazaki | 358/486 |
| 5,019,896 | 5/1991 | Shimazaki | 358/75 |
| 5,170,257 | 12/1992 | Burns | 358/298 |
| 5,249,067 | 9/1993 | Hirosawa | 358/456 |
| 5,260,806 | 11/1993 | Samworth | 358/456 |
| 5,278,672 | 1/1994 | Shimazaki | 358/456 |
| 5,302,972 | 4/1994 | Inoue | 346/108 |
| 5,309,246 | 5/1994 | Barry et al. | 358/298 |
| 5,469,267 | 11/1995 | Wang | 358/298 |
| 5,508,826 | 4/1996 | Lloyd et al. | 358/501 |

FOREIGN PATENT DOCUMENTS

| | | | |
|---|---|---|---|
| 0334518 | 9/1989 | European Pat. Off. | H04N 1/40 |
| 6-303429 | 10/1994 | Japan | H04N 1/40 |
| 7-336536 | 12/1995 | Japan | H04N 1/403 |

OTHER PUBLICATIONS

"Fundamentals of Electronic Imaging Systems", Schreiber, 1986, Springer–Verlag, Berlin, pp. 160–183.

"Digital Halftoning on the IBM 420 Printer", Goetzel et al., I.B.M. Journal of Research and Development, (1987) Jan., No. 1.

*Primary Examiner*—Edward L. Coles, Sr.
*Assistant Examiner*—Stephen Brinich
*Attorney, Agent, or Firm*—Sughrue, Mion, Zinn, Macpeak & Seas, PLLC

[57] ABSTRACT

An halftone dot image output apparatus scans a photosensitive medium with a laser beam which is selectively turned on and off based on an indicated halftone dot area percentage that is inputted, for thereby recording the halftone dot image on the photosensitive medium, and develops the recorded halftone dot image to output a film with the halftone dot image recorded thereon. The halftone dot image output apparatus has a halftone gradation calibrator for calibrating a gradation of the halftone dot image in order to equalize the indicated halftone dot area percentage with an output halftone dot area percentage on the film depending on output conditions including a screen ruling, a test pattern generating and outputting unit for outputting a test halftone dot image to a film prior to outputting a new halftone dot image on the film, a measuring unit for measuring a halftone dot area percentage of the test halftone dot image on the film, a laser power calculator and a laser power setting unit for resetting an amount of exposure to the laser beam based on the measured halftone dot area percentage in order to equalize the indicated halftone dot area percentage with the output halftone dot area percentage for recalibration.

13 Claims, 9 Drawing Sheets

METHOD OF AN APPARATUS FOR OUTPUTTING HALFTONE DOT IMAGE

BACKGROUND OF THE INVENTION

1. Field of the Invention

The present invention relates to a method of and an apparatus for outputting a halftone dot image, in various image output systems, including an image scanning recording apparatus such as a printer or the like, an output engine of an image setter, or an output apparatus of a color/monochromatic scanner, which expose and scan a photosensitive medium such as a photographic film with a laser beam that is selectively turned on and off by modulating information, thereby recording the information on the photosensitive medium, develops the photosensitive medium, and outputs the photosensitive medium with a halftone dot image thereon.

2. Description of the Related Art

Halftone dot image output apparatus require that the halftone dot area percentage of a continuous gradation image represented by inputted continuous gradation data and the output halftone dot area percentage of a halftone dot image on an outputted photographic film be equal to each other for producing an accurate fine image having well reproduced colors and free of any tone jumps. To meet the above requirement, the halftone dot image output apparatus has a halftone gradation calibrator for calibrating input and output gradations, i.e., carrying out a halftone gradation calibration process. The output halftone dot area percentage of a halftone dot image on an outputted photographic film can be measured by a halftone dot area percentage meter or a densitometer.

In order to output a halftone dot image based on the continuous gradation image data which have been subjected to the halftone gradation calibration process by the halftone gradation calibrator, the continuous gradation image data are converted into halftone dot (binary) image data by a halftone dot (binary) processor, and the laser beam is selectively turned on and off based on the halftone dot image data of two values, i.e., values "1" and "0".

The halftone dot area percentage of a continuous gradation image represented by continuous gradation data supplied to the halftone gradation calibrator is usually referred to as an indicated halftone dot area percentage.

The halftone gradation calibration process is performed by the halftone gradation calibrator to equalize the indicated halftone dot area percentage with the output halftone dot area percentage of a halftone dot image on a photographic film.

In order to carry out the halftone gradation calibration process, test halftone dot images (test patches) of different indicated halftone dot area percentages at 10% intervals, for example, are outputted on a photographic film under each of desired output conditions including the types of photosensitive mediums, exposure conditions of laser beam energy quantities and beam diameters, screen rulings, screen angles, screen types, and developers, and the output halftone dot area percentages of the test halftone dot images on the photographic film are measured. The measured output halftone dot area percentages are compared with the indicated halftone dot area percentages, generating a halftone gradation calibration table as a lookup table, and the generated halftone gradation calibration table is stored in the halftone gradation calibrator. Such a preparatory process is disclosed in Japanese laid-open patent publication No. 6-303429 entitled "Method of correcting halftone dot image data and image processing apparatus having a function to correct halftone dot image data and Japanese laid-open patent publication No. 7-336536 entitled "Image data processing apparatus", for example.

Figure 7:
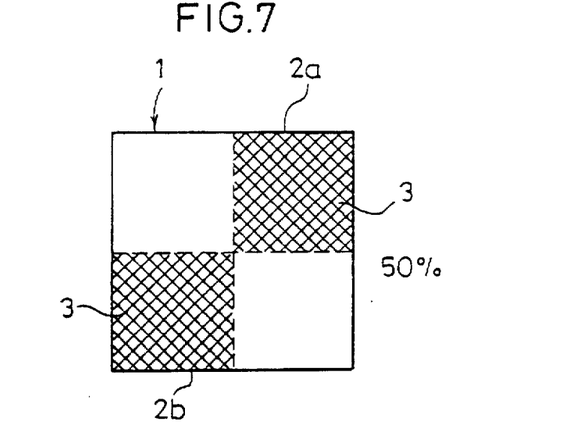
FIG. 7 is a view showing a digital halftone dot pattern having an indicated halftone dot area percentage of 50%.

The generation of the halftone gradation calibration table will specifically be described with reference to FIG. 7 of the accompanying drawings. As shown in FIG. 7, a halftone dot image 1 having a predetermined screen ruling, a predetermined screen type, and a predetermined screen angle is represented by halftone dot image data as a digital halftone dot pattern having an indicated halftone dot area percentage of 50%. Based on the halftone dot image data, a photosensitive medium (not shown) is scanned by a laser beam to record a latent image of pixels 3 in areas 2a, 2b of the halftone dot image 1 on the photosensitive medium. The halftone dot pattern is considered to be a bit map memory image where memory bits are selectively turned on and off.

The latent image recorded on the photosensitive medium is then developed under given conditions including a developer, a developing temperature, a developing time, etc., and then fixed, thereby producing a photographic film with the image recorded thereon.

Figure 8:
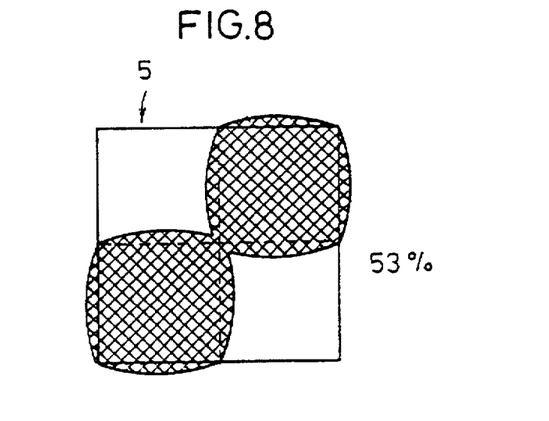
FIG. 8 is a view showing a halftone dot image having an output halftone dot area percentage of 53%, produced on a photographic film based on the digital halftone dot pattern shown in FIG. 7.

FIG. 8 of the accompanying drawings illustrates a halftone dot image 5 which is recorded on the photographic film based on the halftone dot image 1 with the indicated halftone dot area percentage of 50% shown in FIG. 7.

It is assumed that the area percentage of the halftone dot image 5 as measured by a halftone dot area percentage meter or the like, i.e., an output halftone dot area percentage, is 53%.

Since a plurality of test halftone dot images of different indicated halftone dot area percentages at 10% intervals are recorded on the photographic film, it can be estimated substantially accurately at what indicated halftone dot area percentage the output halftone dot area percentage is 50%.

Figure 9:
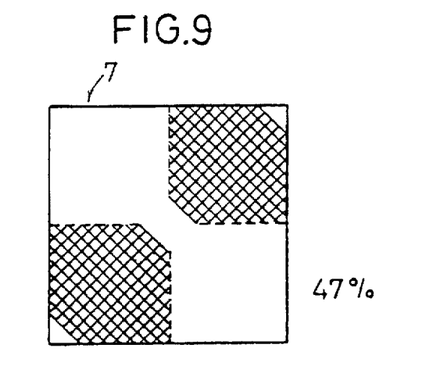
FIG. 9 is a view showing a digital halftone dot pattern having an indicated halftone dot area percentage of 47%.

If the indicated halftone dot area percentage is 47%, then the halftone gradation calibration table stored in the halftone gradation calibrator generates a digital halftone dot pattern representative of a halftone dot image 7 having a halftone dot area percentage of 47% shown in FIG. 9 of the accompanying drawings when the halftone gradation calibrator is supplied with image data having an indicated halftone dot area percentage of 50% with a predetermined screen ruling, a predetermined screen type, and a predetermined screen angle, i.e., with a predetermined screen set.

Figure 10:
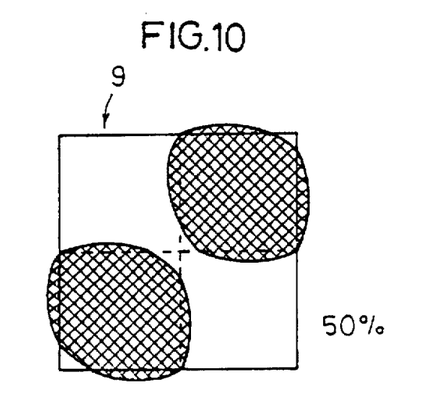
FIG. 10 is a view showing a halftone dot image having an output halftone dot area percentage of 50%, produced on a photographic film based on the digital halftone dot pattern shown in FIG. 9.

More specifically, if the indicated halftone dot area percentage is 50%, then the calibrated halftone dot area percentage is set to 47% using the halftone gradation calibration table stored in the halftone gradation calibrator. When a photosensitive medium is exposed to a scanning laser beam which is selectively turned on and off based on the halftone dot image 7 having the calibrated halftone dot area percentage of 47%. The photosensitive medium is then developed into a photographic film which carries a halftone dot image 9 (see FIG. 10 of the accompanying drawings) having a desired output halftone dot area percentage of 50%.

The halftone gradation calibration table stored in the halftone gradation calibrator is generally required to contain as many table data as the number of combinations of desired screen rulings, desired screen types, and desired screen angles, i.e., the number of screen sets. It is therefore necessary to repeat a cyclic process of outputting a test halftone dot image, measuring a halftone dot area percentage, and generating table data for the number of such screen sets.

For example, if there are nine screen rulings of 65, 85, 100, 120, 133, 150, 175, 200, and 250, four screen angles, and three screen types, then it is necessary to repeat a total of 9×4×3=108 cyclic processes until a desired halftone gradation calibration table is generated. Such a table generation procedure is a considerably tedious and time-consuming task to perform.

After a halftone gradation calibration table has been generated, if output halftone dot area percentages are varied because photosensitive mediums are changed or developers are changed, then halftone gradation calibration table data have to be generated again with respect to the screen rulings, the screen angles, and the screen types, i.e., the screen sets.

Figure 11:
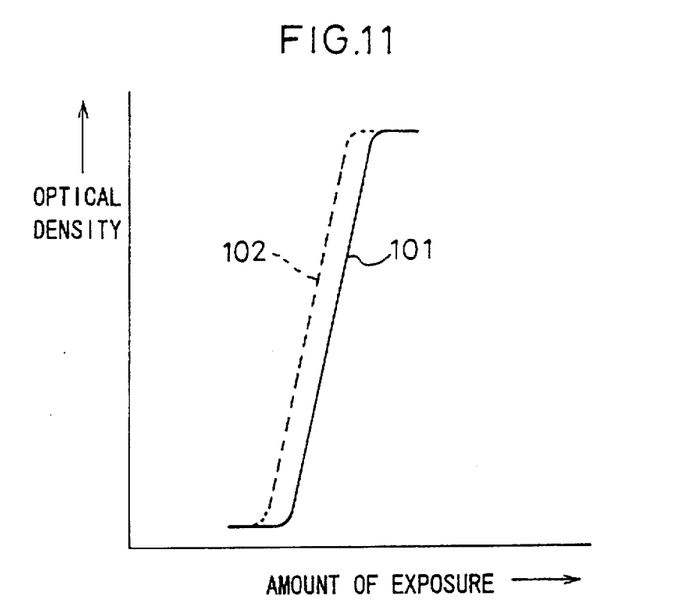
FIG. 11 is a diagram showing how the sensitivity of a photosensitive medium changes.

There has recently been put to use a photosensitive medium which can produce high optical densities and ultra-high contrast (steep gamma curve). As shown in FIG. 11 of the accompanying drawings, such a photosensitive medium has a photosensitivity curve 101 when developed with a fresh developer and also has a different photosensitivity curve 102 when developed with the developer overly replenished after being used for a certain period of time. Consequently, the output halftone dot area percentages for the photosensitive medium tend to vary to a much greater extent than for the conventionally used RAS photosensitive mediums.

SUMMARY OF THE INVENTION

It is a general object of the present invention to provide a method of and an apparatus for outputting a halftone dot image while compensating for variations of halftone dot area percentages due to changes in active properties of developers and changing of photosensitive mediums, with a simple arrangement.

A major object of the present invention is to provide a method of and an apparatus for outputting a halftone dot image on a photographic film by outputting test halftone dot images on a photographic film, resetting the amount of exposure to a laser beam based on halftone dot area percentages of the test halftone dot images, and recalibrating halftone gradations to equalize indicated and output halftone dot area percentages with each other.

It is possible to reset an amount of exposure to a laser beam more accurately by setting the screen ruling of a test halftone dot image to a screen ruling greater than the screen ruling of a new halftone dot image to be outputted on a photographic film, and/or setting the indicated halftone dot area percentage of the test halftone dot image to 50%.

If the screen ruling of the new halftone dot image is a main screen ruling of 175, then the screen ruling of the test halftone dot image is selected to be 430, for example.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
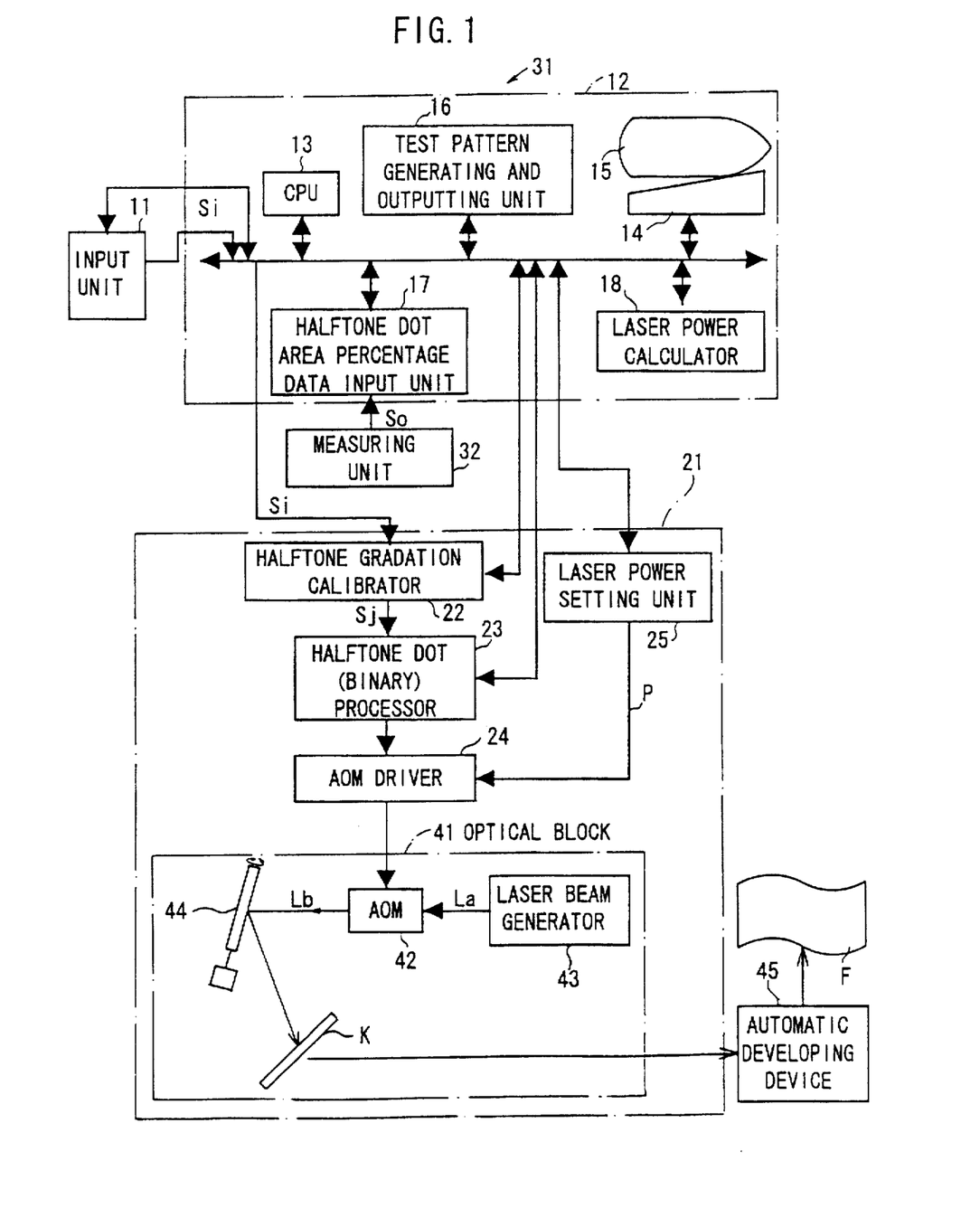
FIG. 1 is a block diagram of a halftone dot image output apparatus according to the present invention.

FIG. 1 shows in block form a halftone dot image output apparatus 31 according to the present invention.

As shown in FIG. 1, the halftone dot image output apparatus 31 basically comprises a controller 12 and a calibration output assembly 21.

The controller 12 is supplied with halftone dot area percentage data Si of respective colors, i.e., C (cyan), M (magenta), Y (yellow), and K (black), from an input unit 11. The input unit 11 has a CCD area/linear sensor for reading an image on a continuous-gradation image carrier such as a photograph or the like to produce continuous-gradation image data of R (red), G (green), and B (blue). The input unit 11 converts the continuous-gradation image data into halftone dot area percentage data Si of C, M, Y, K, and outputs the halftone dot area percentage data Si of C, M, Y, K to the controller 12. Since the halftone dot area percentage data Si are also image data, the halftone dot area percentage data Si may also be referred to as image data Si. If the image data Si have 256 gradations, then the halftone dot area percentage of the image data Si varies at intervals of about 0.4 ($\frac{1}{256}$) %.

The controller 12 has a CPU (central processing unit) 13 serving as a control means for processing the supplied image data Si for edge emphasis and other image processing operations. Since, however, the present invention has no bearing on such image processing, it is assumed that the image data Si are supplied from the controller 12 to a halftone gradation calibrator (halftone gradation calibrating means) 22 of the calibration output assembly 21. The halftone dot area percentage data Si supplied to the halftone gradation calibrator 22 are also referred to as indicated halftone dot area percentage data Si or simply indicated halftone dot area percentage Si.

To the CPU 13, there are connected a keyboard 14 as a data input means, a CRT display 15 as a display means, a test pattern generating and outputting unit (test halftone dot image outputting means) 16 for generating and outputting a test pattern having a test halftone dot image for determining a laser power, a halftone dot area percentage data input unit 17, and a laser power calculator 18 for calculating a laser power in a manner described later on. A measuring unit (measuring means) 32, such as a halftone dot area percentage meter or a densitometer, for measuring a halftone dot area percentage is connected to the halftone dot area percentage data input unit 17. Measured halftone dot area percentage data, represented by an output signal from the measuring unit 32, are supplied as an output halftone dot area percentage So to the halftone dot area percentage data input unit 17.

The halftone gradation calibrator 22 stores a halftone gradation calibration table which was generated when a developer was fresh depending on output conditions (screen rulings, screen types, screen shapes, and photosensitive mediums).

According to the halftone gradation calibration table, the halftone gradation calibrator 22 converts indicated halftone dot area percentage data Si into calibrated halftone dot area percentage data Sj, which are then supplied to a halftone dot (binary) processor 23.

The halftone dot processor 23 compares the calibrated halftone dot area percentage data Sj with thresholds T of a threshold matrix (not shown) for thereby converting the calibrated halftone dot area percentage data Sj into binary image data represented by values 0 (corresponding to the turning-off of a laser beam) and values 1 (corresponding to the turning-on of a laser beam (The on-level of the laser beam may be varied as described later on)). Specifically, the calibrated halftone dot area percentage data Sj are converted into binary image data according to a formula: $Sj>T \rightarrow 1$, $Sj \leq T \rightarrow 0$.

The binary image data are converted by an AOM (acoustooptic modulator) driver 24 into a drive signal for an AOM 42 of an optical block 41. The drive signal is supplied to an intensity modulation terminal of the AOM 42. The drive signal has an on-level established by a laser power setting signal (which may be referred to as a laser power setting or simply a laser power) which is outputted from a laser power setting unit 25. The laser power calculator 18 and the laser power setting unit 25 jointly make up a gradation re-calibrating means.

A laser beam La emitted from a laser beam generator 43 such as an He—Ne laser is selectively turned on and off by the AOM 42 depending on the drive signal, and applied as a laser beam Lb to an optical deflector 44 which comprises a scanning optical system such as a galvanometer mirror or the like. The laser beam Lb is directed by the optical deflector 44 toward a photosensitive medium K to scan the photosensitive medium K in a main scanning direction while the photosensitive medium K is being fed in an auxiliary scanning direction, thereby recording a latent halftone dot image on the photosensitive medium K.

The latent halftone dot image recorded on the photosensitive medium K is then developed and fixed by an automatic developing device 45, which produces a film F with a visible halftone dot image recorded thereon.

The laser beam generator 43 may comprise a semiconductor laser such as a laser diode or the like rather than a gas laser such as an He—Ne laser. If a semiconductor laser is used, then the AOM driver 24 and the AOM 42 may be dispensed with, and the output signal from the laser power setting unit 25 may be supplied to a semiconductor laser driver to vary a laser oscillation current flowing through the semiconductor laser.

Operation of the halftone dot image output apparatus 31 shown in FIG. 1 will be described below with reference to FIG. 2.

It is assumed that the halftone gradation calibrator 22 stores a halftone gradation calibration table which was generated when a developer was fresh depending on output conditions (screen rulings, screen types, screen shapes, and photosensitive mediums). Such a halftone gradation calibration table may be generated as disclosed in Japanese laid-open patent publication No. 6-303429.

When new image data Si are supplied from the input unit 11 to the halftone dot image output apparatus 31 to generate a new film F, it is confirmed whether the indicated halftone dot area percentage Si and the output halftone dot area percentage So are equal to each other. If the indicated halftone dot area percentage Si and the output halftone dot area percentage So are different from each other, then the test pattern generating and outputting unit 16 generates a test pattern for calculating an optimum laser power, and supplies the generated test pattern as image data Si to the halftone gradation calibrator 22 in a step S1.

Figure 3A:
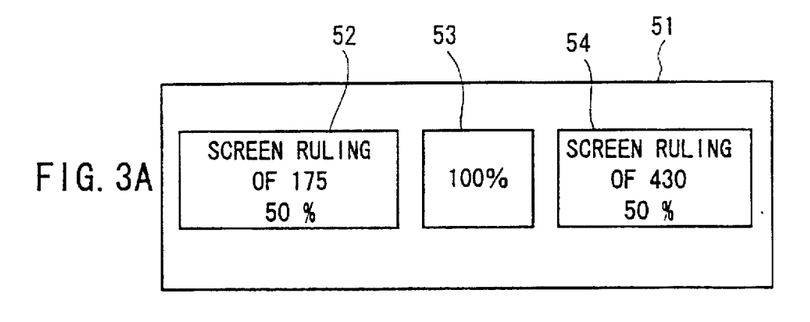
FIG. 3A is a view of a test pattern.

The test pattern is a special test pattern as shown in FIG. 3A. As shown in FIG. 3A, the test pattern, designated by 51, comprises a main test pattern (main test image) 52 having a desired screen ruling, e.g., a main screen ruling of 175 and a halftone dot area percentage of 50%, a solid test pattern 53 having a halftone dot area percentage of 100% for confirming a density, and a higher-screen-ruling test pattern (higher-screen-ruling test image) 54 having a screen ruling of 430 greater than the main screen ruling of 175 and a halftone dot area percentage of 50%. If the test pattern is required only to reset the laser power, then it may comprise only the higher-screen-ruling test pattern 54.

The inventors have found out, based on various experimental results, described below, that the higher-screen-ruling test pattern 54 is highly sensitive to amounts of exposure of the laser beam and developer conditions, i.e., has a high rate of change.

Figure 4:
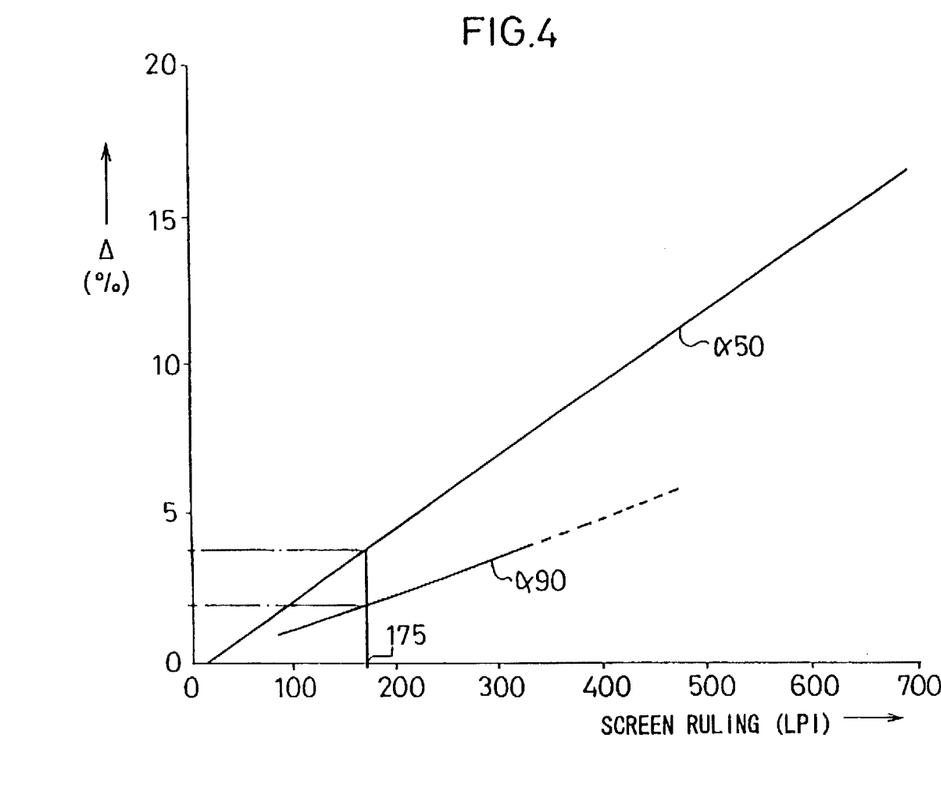
FIG. 4 is a diagram of experimental results showing how the rate of change of a halftone dot area percentage varies when a developer changes from a fresh state (a lowly active state) to a highly active state.

FIG. 4 shows how the rate of change $\Delta(\%)$ of a halftone dot area percentage varies when a developer changes from a fresh state (a lowly active state) to a highly active state. In FIG. 4, a characteristic curve $\alpha 50$ indicates the dependency of the rate of change $\Delta(\%)$ upon the screen ruling when the halftone dot area percentage Si is Si=50%, and a characteristic curve $\alpha 90$ indicates the dependency of the rate of change $\Delta(\%)$ upon the screen ruling when the halftone dot area percentage Si is Si=90%. Although not shown in FIG. 4, it has been confirmed that the rates of change $\Delta(\%)$ lie between the characteristic curves $\alpha 50$ and $\alpha 90$ when the halftone dot area percentage Si ranges from 10 to 50% as well as 50 to 90%.

It can be seen from FIG. 4 that the rate of change $\Delta(\%)$ of the halftone dot area percentage varies depending on the screen ruling, and that as the screen ruling is greater, the rate of change $\Delta(\%)$ becomes greater, and the rate of change $\Delta(\%)$ is maximum when the halftone dot area percentage is 50%. For example, if the screen ruling is 175, then the rate of change $\Delta(\%)$ of the halftone dot area percentage on the characteristic curve $\alpha 90$ is about 2%, signifying that the halftone dot area percentage is 90% when the developer is fresh and the halftone dot area percentage is 92% after the developer is changed in properties, and the rate of change $\Delta(\%)$ of the halftone dot area percentage on the characteristic curve $\alpha 50$ is about 4%.

Since the rate of change $\Delta(\%)$ varies maximally when the halftone dot area percentage is 50%, if halftone gradations are corrected when the halftone dot area percentage is 50%, then halftone gradations can be corrected accurately and automatically at other halftone dot area percentage values.

As shown in FIG. 11, a change from the photosensitivity curve 101 at the time the developer is fresh to the photosensitivity curve 102 after the developer is changed in properties can be approximated by a change in the sensitivity of the recording medium. Therefore, it can be understood that if the laser power is changed by a degree commensurate with the change in the sensitivity of the recording medium, or actually if the laser power is reduced by a degree commensurate with an increase in the sensitivity of the recording medium, then halftone gradations can be corrected at any desired screen ruling.

Changes in the output halftone dot area percentage So with respect to changes in the laser power were experimentally confirmed.

Figure 5:
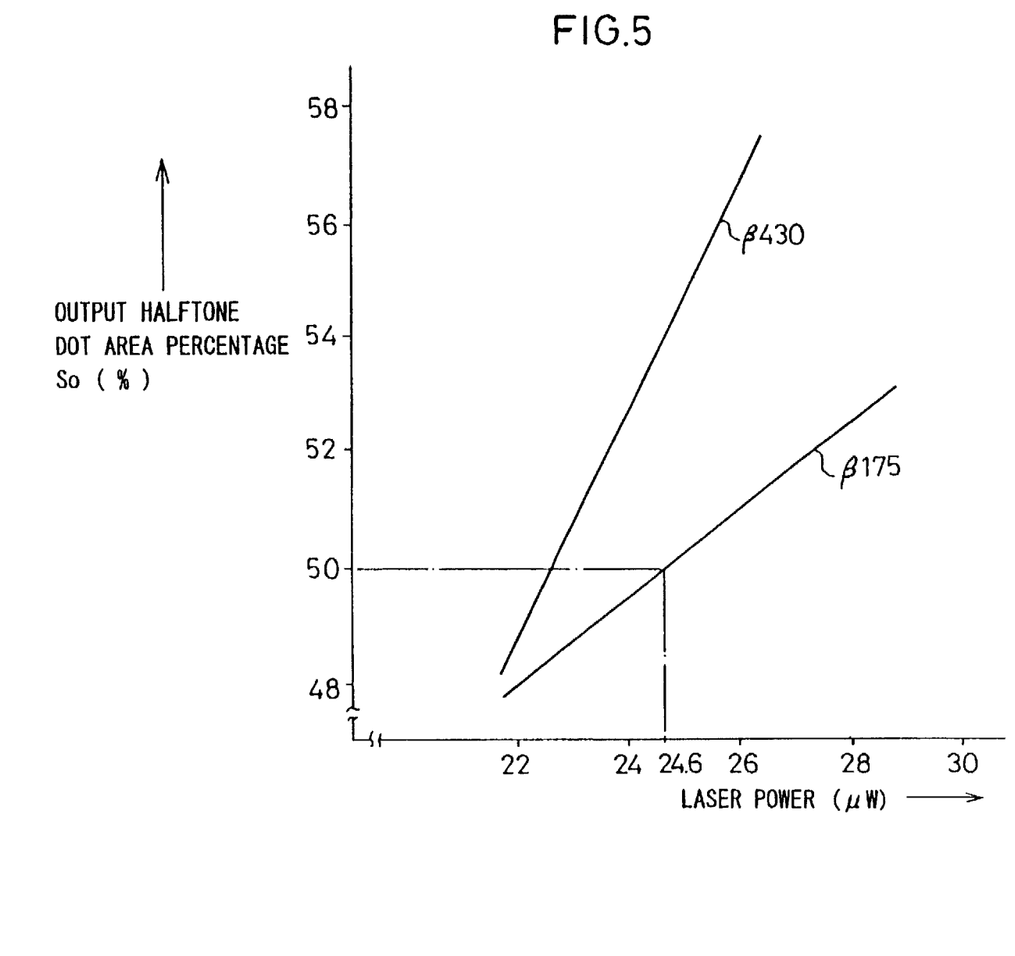
FIG. 5 is a diagram of experimental results showing how the rate of change of a halftone dot area percentage varies when a laser power changes.

The experimental results are shown in FIG. 5. In FIG. 5, when the laser power (μW) changes, the output halftone dot area percentage So changes according to a characteristic curve β175 at the time the screen ruling is 175, the halftone dot area percentage is 50%, and the screen angle is 45°, and according to a characteristic curve β430 at the time the screen ruling is 430, the halftone dot area percentage is 50%, and the screen angle is 45°. It can be seen from FIG. 5 that the output halftone dot area percentage So is 50% with the characteristic curve β175 when the laser power is 24.6 μW.

It will be understood from the experimental results shown in FIG. 5 that as the laser power changes (increases), the output halftone dot area percentage So changes (increases) linearly at a gradient approximated by a linear increase or decrease depending on whether the screen ruling is higher or smaller.

Figure 6:
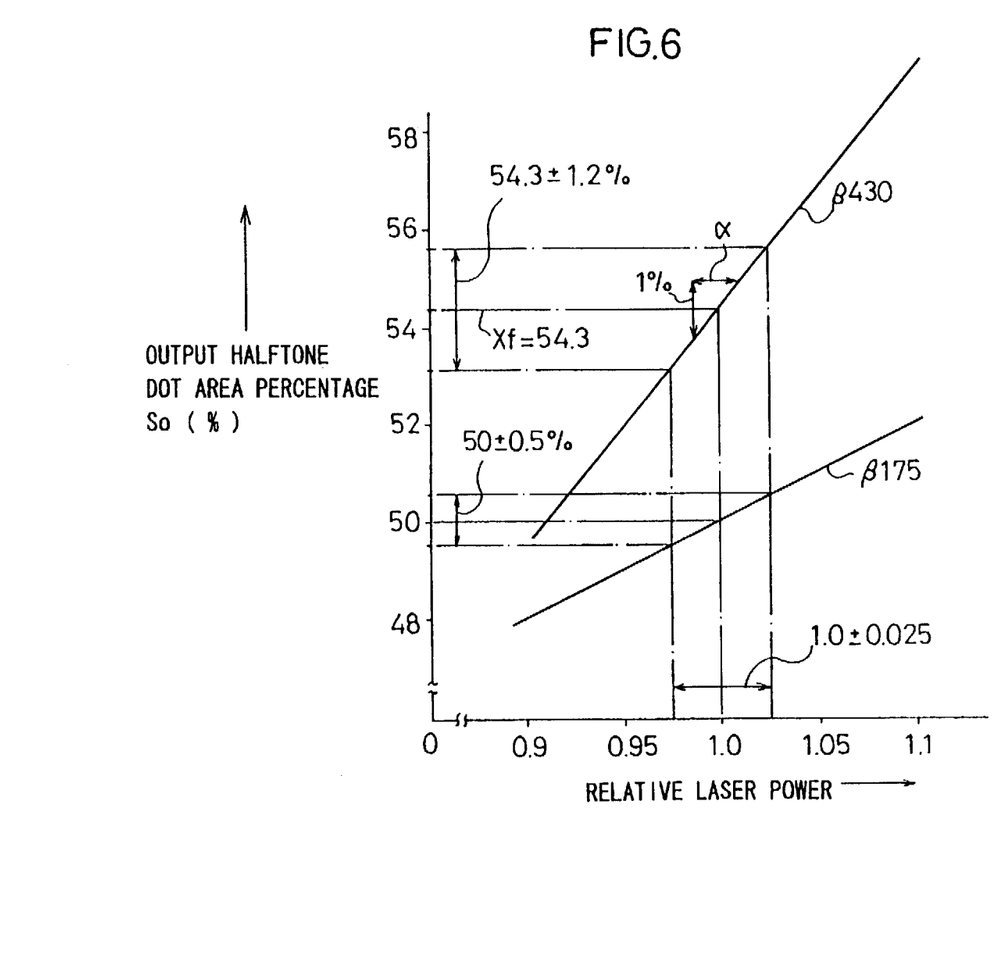
FIG. 6 is a diagram similar to FIG. 5 except that the laser power is normalized into relative laser power.

FIG. 6 shows how the output halftone dot area percentage So changes with respect to a relative laser power with the laser power of 24.6 μW being normalized to 1.0. Therefore, the graph shown in FIG. 6 is a redrawing of the graph shown in FIG. 5. For an easier understanding, characteristic curves shown in FIG. 6 are denoted by the same reference characters as those used in FIG. 5, i.e., β175, β430.

A study of FIG. 6 indicates that in order to keep the output halftone dot area percentage So within a range ±0.5% of the allowable range (optimum range) of 50% when the screen ruling is 50%, the output halftone dot area percentage So on the characteristic curve β430 with the screen ruling of 430 may be kept in 54.3%±1.2%, and that the relative laser power may vary in a range of 1.0±0.025. Since an ordinary halftone dot area percentage meter for use as the measuring unit 32 has a resolution expressed in increments of 1%, if such a halftone dot area percentage meter is used as the measuring unit 32, then the output halftone dot area percentage So on the characteristic curve β430 with the screen ruling of 430 may be kept in 54%±1%.

A reference laser power P for a present amount of exposure, i.e., when the developer is fresh, and a given photosensitive medium, is expressed as P=Pc. When a halftone dot test pattern converted from the test pattern 51 having the higher-screen-ruling test pattern (higher-screen-ruling test image) 54 at the time developer is possibly changed properties is outputted to a film F, a halftone dot area percentage (output halftone dot area percentage) measured with respect to a test pattern corresponding to the test pattern 54 with the screen ruling of 430 on the film F is represented by X. Furthermore, a halftone dot area percentage with the screen ruling of 430 at an optimum laser power (the relative laser power of 1.0 in FIG. 6) which equalizes the output halftone dot area percentage So with the indicated halftone dot area percentage Si (Si=So=50%) at the screen ruling of 175 as shown in FIG. 6 is represented by Xf. If the laser power P to be newly established by the AOM driver 24 is expressed as P=Pn, then the new laser power Pn is determined by the following equation (1):

$$Pn = \{1 + (Xf - X) \times \alpha\} \times Pc \qquad (1)$$
$$= \{1 + (54.3 - X) \times 0.023\} \times Pc$$

where α is the change in the relative laser power corresponding to a unit change of 1% of the halftone dot area percentage. If the screen ruling which represents a resolution is other than the normal screen ruling of 175, then the equation (1) may be determined in relation to the screen ruling of 430 with respect to those other screen rulings (m) than the screen ruling of 175. Specifically, if a characteristic curve with the halftone dot area percentage of 50% and the screen ruling of m is represented by βm and a characteristic curve with the screen ruling of 430 is represented by β430, then a new halftone dot area percentage Xf for the characteristic curve β430 with the screen ruling of m and the relative laser power of 1.0 may be determined. The gradient α is constant.

The foregoing explanation is a description of the need for generating the special test pattern 51 shown in FIG. 3A.

As described above, the test pattern 51 comprises the main test pattern 52, to be finally outputted to the film F, having a desired screen ruling, e.g., a main screen ruling of 175 and a halftone dot area percentage of 50%, a solid test pattern 53 having a halftone dot area percentage of 100% for confirming a density, and a higher-screen-ruling test pattern (higher-screen-ruling test image) 54 having a screen ruling of 430 greater than the main screen ruling of 175 and a halftone dot area percentage of 50%.

Figure 2:
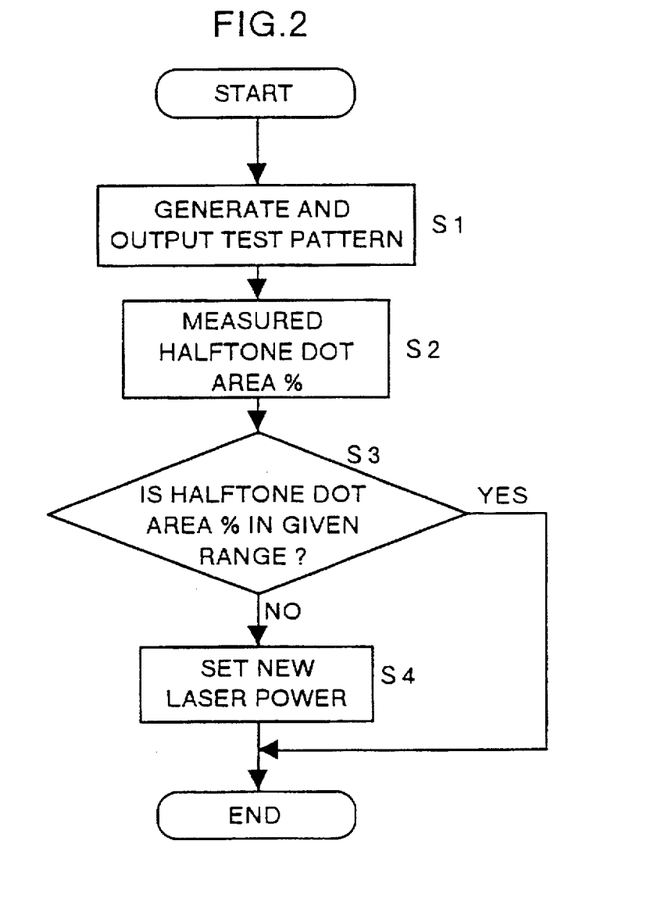
FIG. 2 is a flowchart of an operation sequence of the halftone dot image output apparatus shown in FIG. 1.

After the step S1 shown in FIG. 2, a halftone gradation calibration process is effected on the test pattern using a corresponding a halftone gradation calibration lookup table, i.e., a halftone gradation calibration lookup table for the screen ruling of 175, generated when the developer is fresh depending on output conditions (screen rulings, screen types, screen shapes, and photosensitive mediums) and stored in the halftone gradation calibrator 22.

The calibrated test pattern is then converted into halftone dot data by the halftone dot processor 23. Thereafter, the photosensitive medium K is exposed to the present laser power Pc, and then developed by the automatic developing device 45 with the developer which may possibly be changed in properties, thereby producing a test film 51F (see FIG. 3B) with a visible test pattern recorded thereon. The visible test pattern recorded on the test film 51F includes a main test pattern 72 having a screen ruling of 175 and a halftone dot area percentage of 50%, a solid test pattern 73, and a higher-screen-ruling test pattern 74 having a screen ruling of 430 and a halftone dot area percentage of 50%. Then, the halftone dot area percentages and/or densities of the test patterns 72, 73, 74 are measured by the measuring unit 32 in a step S2.

Figure 3B:
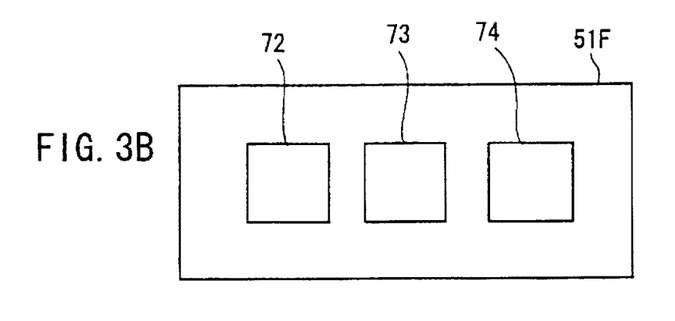
FIG. 3B is a view of a photographic film with halftone dot test patterns developed thereon.

It is determined in a step S3 whether of the output halftone dot area percentages So of the measured test patterns 72, 73, 74, the measured halftone dot area percentage (indicated halftone dot area percentage) So of the main test pattern 72 is of a value in the allowable range of 50%±0.5% or not.

If the measured halftone dot area percentage So of the main test pattern 72 is of a value in the allowable range of 50%±0.5%, then since the developer is considered to be in adequate conditions, the image data Si may be outputted to the film F with the present laser power Pc.

If the measured halftone dot area percentage So of the main test pattern 72 is not of a value in the allowable range of 50%±0.5%, then the laser power calculator 18 calculates a new laser power Pn according to the equation (1) using the measured halftone dot area percentage of the higher-screenruling test pattern 74 as X, and the calculated new laser power Pn is set in the AOM driver 24 by the laser power setting unit 25 in a step S4.

Because the laser power P is set to P=Pn, even if the developer is changed in properties or the photosensitive medium is replaced with a photosensitive medium from another lot, the indicated halftone dot area percentage Si with respect to the image data Si and the output halftone dot area percentage So with respect to the halftone dot image recorded on the film F are substantially equalized with each other.

In the above embodiment, the test pattern 54 which is sensitive to a change in the development process is generated, the higher-screen-ruling test pattern 74 is outputted to the film F, and the halftone dot area percentage X of the higher-screen-ruling test pattern 74 is measured by the measuring unit 32. Then, a new laser power Pn which is an optimum laser power is calculated from the measured halftone dot area percentage X, and set as the laser power P in the AOM driver 24. In this manner, the halftone gradation calibration process is carried out.

Specifically, the halftone gradation calibration lookup table is generated, and one test film F is outputted even when a developing condition is changed and hence the output halftone dot area percentage is varied with respect to a screen set (a combination of a screen ruling, a screen angle, and a screen type) with respect to which the indicated halftone dot area percentage Si is equalized with the output halftone dot area percentage So. The laser power P is then adjusted and reset based on the test film F for thereby equalizing the indicated halftone dot area percentage Si with the output halftone dot area percentage So with respect to all screen sets. As a result, the halftone gradation calibration process is simplified, and the period of time required to carry out the halftone gradation calibration process is shortened.

According to the present invention, therefore, for outputting a new halftone dot image to a film, a test halftone dot image is outputted to the film, and the halftone dot area percentage or density of the test halftone dot image on the film is measured. Based on the measured halftone dot area percentage or density, the amount of exposure to a laser beam is reset to equalize an indicated halftone dot area percentage with an output halftone dot area percentage for recalibration. Since the amount of exposure to a laser beam may be reset by varying the intensity of a laser beam applied to a photosensitive medium, for example, it can easily be reset through a simple arrangement, e.g., intensity modulation using an acoustooptic modulator or intensity modulation based on an increase or decrease in a current supplied to a semiconductor laser such as a laser diode which is used as a laser beam source.

Stated otherwise, for outputting a new halftone dot image to a film, a test halftone dot image is outputted to the film, the halftone dot area percentage or density of the test halftone dot image on the film is measured, and based on the measured halftone dot area percentage or density, the amount of exposure to a laser beam is reset. Through the above simple process, it is possible to effect a recalibration (compensation) process to equalize an indicated halftone dot area percentage with an output halftone dot area percentage even if the active properties of the developer change or the photosensitive medium is replaced.

If the screen ruling of the test halftone dot image is higher than the screen ruling of the new halftone dot image, then it is possible to easily calculate a more accurate amount of exposure to a laser beam.

Furthermore, if the halftone dot area percentage of the test halftone dot image is 50%, then a much more accurate amount of exposure to a laser beam can be calculated.

Although a certain preferred embodiment of the present invention has been shown and described in detail, it should be understood that various changes and modifications may be made therein without departing from the scope of the appended claims.

What is claimed is:

1. A method of outputting a halftone dot image by scanning a photosensitive medium with a laser beam which is selectively turned on and off based on an indicated halftone dot area percentage that is inputted, for thereby recording the halftone dot image on the photosensitive medium, and developing the recorded halftone dot image to output a film with the halftone dot image recorded thereon, comprising the steps of:

calibrating a gradation of the halftone dot image in order to equalize the indicated halftone dot area percentage with an output halftone dot area percentage on the film depending on previously existing output conditions including a screen ruling;

prior to outputting a new halftone dot image on a film, outputting a test halftone dot image to the film using an initial exposure amount of the laser beam;

measuring a halftone dot area percentage or density of the test halftone dot image on the film; and changing an amount of exposure to the laser beam based on the measured halftone dot area percentage or density in order to equalize the indicated halftone dot area percentage with the output halftone dot area percentage for recalibration, wherein said test halftone dot image has a screen ruling different from the screen ruling of said new halftone dot image.

2. A method according to claim 1, wherein said test halftone dot image has a screen ruling greater than the screen ruling of said new halftone dot image.

3. A method according to claim 1, wherein the indicated halftone dot area percentage of said test halftone dot image is 50%.

4. A method according to claim 1, wherein said test halftone dot image has a screen ruling greater than the screen ruling of said new halftone dot image, and the indicated halftone dot area percentage of said test halftone dot image is 50%.

5. A method according to claim 1, wherein the amount of exposure to the laser beam is reset by varying the power of the laser beam.

6. An apparatus for outputting a halftone dot image by scanning a photosensitive medium with a laser beam which is selectively turned on and off based on an indicated halftone dot area percentage that is inputted, for thereby recording the halftone dot image on the photosensitive medium, and developing the recorded halftone dot image to output a film with the halftone dot image recorded thereon, comprising:

halftone gradation calibrating means for calibrating a gradation of the halftone dot image in order to equalize the indicated halftone dot area percentage with an output halftone dot area percentage on the film depending on previously existing output conditions including a screen ruling;

test halftone dot image output means for outputting a test halftone dot image to a film using an initial exposure amount of the laser beam prior to outputting a new halftone dot image on the film;

measuring means for measuring a halftone dot area percentage or density of the test halftone dot image on the film; and gradation recalibrating means for changing an amount of exposure to the laser beam based on the measured halftone dot area percentage or density in order to equalize the indicated halftone dot area percentage with the output halftone dot area percentage for recalibration, wherein said test halftone dot image has a screen ruling different from the screen ruling of said new halftone dot image.

7. An apparatus according to claim 6, wherein said test halftone dot image has a screen ruling greater than the screen ruling of said new halftone dot image.

8. An apparatus according to claim 6, wherein the indicated halftone dot area percentage of said test halftone dot image is 50%.

9. An apparatus according to claim 6, wherein said test halftone dot image has a screen ruling greater than the screen ruling of said new halftone dot image, and the indicated halftone dot area percentage of said test halftone dot image is 50%.

10. An apparatus according to claim 6, wherein the gradation recalibrating means resets the amount of exposure to the laser beam by varying the power of the laser beam.

11. An apparatus for outputting a halftone dot image with an indicated halftone dot area percentage which is inputted and an output halftone dot area percentage of a halftone dot image on an outputted film being calibrated to equal values at a given screen ruling, comprising:

laser beam quantity setting means for setting the quantity of a laser beam which is selectively turned on and off to record a halftone dot image on the film; and laser beam quantity calibrating means, connected to said laser beam quantity setting means, for calibrating quantity of the laser beam;

said laser beam quantity calibrating means comprising means for:

storing the set quantity of the laser beam which is calibrated as a reference quantity setting, varying the quantity of the laser beam based on said reference quantity setting, and measuring and storing an allowable range of quantities of the laser beam corresponding to an allowable range of output halftone dot area percentages;

measuring an output halftone dot area percentage (Xf) with respect to the indicated halftone dot area percentage at a screen ruling greater than said given screen ruling, and measuring and storing a rate of change ($\alpha$) of the quantity of the laser beam with respect to a unit change of the output halftone dot area percentage in the vicinity of the measured output halftone dot area percentage (Xf);

for outputting a film on which a new halftone dot image is recorded with said given screen ruling, outputting said film with a test halftone dot image recorded thereon with said indicated halftone dot area percentage and the screen ruling greater than said given screen ruling, and setting the quantity of the laser beam to a multiple by $\{1+(Xf-X)\alpha\}$ of said reference quantity setting when a measured halftone dot area percentage of the test halftone dot image is represented by (X).

12. An apparatus according to claim 11, wherein the indicated halftone dot area percentage of said test halftone dot image is 50%.

13. An apparatus according to claim 11, wherein the laser beam quantity calibrating means sets the quantity of the laser beam by varying the power of the laser beam.

* * * * *